United States Patent
Talcott

(10) Patent No.: US 9,200,223 B2
(45) Date of Patent: Dec. 1, 2015

(54) APPARATUS FOR A SYNGAS COOLER AND METHOD OF MAINTAINING THE SAME

(71) Applicant: General Electric Company, Schenectady, NY (US)

(72) Inventor: David Clark Talcott, Houston, TX (US)

(73) Assignee: General Electric Comapny, Schenectady, NY (US)

(*) Notice: Subject to any disclaimer, the term of this patent is extended or adjusted under 35 U.S.C. 154(b) by 519 days.

(21) Appl. No.: 13/630,454

(22) Filed: Sep. 28, 2012

(65) Prior Publication Data

US 2014/0090296 A1  Apr. 3, 2014

(51) Int. Cl.
| | | |
|---|---|---|
| *C10J 3/00* | (2006.01) | |
| *C10K 1/04* | (2006.01) | |
| *C10J 3/48* | (2006.01) | |
| *C10J 3/84* | (2006.01) | |

(52) U.S. Cl.
CPC *C10J 3/485* (2013.01); *C10J 3/845* (2013.01); *C10K 1/04* (2013.01); *Y02E 20/18* (2013.01); *Y10T 137/0402* (2015.04)

(58) Field of Classification Search
CPC ........................................................ C10J 3/845
See application file for complete search history.

(56) References Cited

U.S. PATENT DOCUMENTS

| | | | | |
|---|---|---|---|---|
| 3,593,968 | A * | 7/1971 | Geddes | 261/118 |
| 4,801,307 | A * | 1/1989 | Muenger et al. | 48/69 |
| 4,828,578 | A * | 5/1989 | Den Bleyker | 48/69 |
| 4,828,580 | A * | 5/1989 | Dach | 48/69 |
| 4,880,438 | A * | 11/1989 | Den Bleyker | 48/69 |
| 4,992,081 | A * | 2/1991 | Den Bleyker | 48/69 |
| 8,197,564 | B2 | 6/2012 | Jimenez-Huyke et al. | |
| 2005/0132647 | A1 | 6/2005 | Groen | |
| 2010/0140817 | A1* | 6/2010 | Harteveld et al. | 261/112.1 |
| 2012/0102835 | A1 | 5/2012 | Corry et al. | |

* cited by examiner

Primary Examiner — Matthew Merkling
(74) Attorney, Agent, or Firm — Armstrong Teasdale LLP

(57) ABSTRACT

A quench ring assembly for a high-temperature vessel includes a main structural sub-assembly coupled to at least one lower wall tube. The quench ring assembly also includes a flow control sub-assembly coupled to the main structural sub-assembly and extending circumferentially therethrough. The quench ring assembly further includes a wear sub-assembly removably coupled to the main structural sub-assembly. The wear sub-assembly includes a heat shield canopy extending over the flow control sub-assembly.

11 Claims, 4 Drawing Sheets

APPARATUS FOR A SYNGAS COOLER AND METHOD OF MAINTAINING THE SAME

BACKGROUND OF THE INVENTION

This invention relates generally to synthesis gas, or syngas, coolers for use in a gasifier system, and, more specifically, to a quench ring assembly for use with a syngas cooler.

Many known gasifier systems include a reactor that defines a reaction chamber in which a fuel mixture is gasified to form a hot product gas and liquefied slag flows downward therefrom. A quench chamber holding a water bath is positioned in the reactor to receive and cool the hot produced effluent. A constricted throat that couples the reaction chamber with the quench chamber directs a stream of the effluent through a dip tube which defines a guide passage to conduct the effluent into the water bath. A toroidally-shaped quench ring is positioned radially inward of the dip tube to direct a water stream onto the dip tube's guide surface.

Most known quench rings include a high-wear hot face portion that is directly exposed to the gasifier's high-temperature and erosive conditions by virtue of the hot product gas which makes contact with hot face portion as the gas is channeled from the reaction chamber to the water bath. While the relatively cooler liquid flowing through the quench ring onto the dip tube's guide surface at least partially mitigates localized high temperatures, significant stresses and strains are induced in the hot face portion of the quench ring. Such thermally-induced stresses and strains facilitate increasing a replacement frequency of the hot face portion due to formation of cracks and fissures along the exposed surface. The hot face portion is typically a portion of a larger structural member, e.g., a removable/replaceable quench ring metal apron that facilitates providing the sacrificial wear surface. In addition, the apron is coupled to a plurality of cooling fluid inlet flanges, typically through welds, such flanges being aligned and coupled with fluid supply lines through fittings, e.g., Grayloc® fittings. Therefore, replacement and/or refurbishment of the hot face portion requires removing the gasifier from service, mobilizing a sizable maintenance crew, uncoupling the flanges, and removing the quench ring in its entirety in sections. During the replacement and/or refurbishment activities that occur outside of the gasifier, the hot face portion is repaired and/or replaced. However, upon replacement of the quench ring sections into the gasifier, the quench ring metal apron and flanges may not be in their original positions and orientations and may not align properly.

BRIEF DESCRIPTION OF THE INVENTION

In one aspect, a quench ring assembly for a high-temperature vessel is provided. The quench ring assembly includes a main structural sub-assembly coupled to at least one lower wall tube. The quench ring assembly also includes a flow control sub-assembly coupled to the main structural sub-assembly and extending circumferentially therethrough. The quench ring assembly further includes a wear sub-assembly removably coupled to the main structural sub-assembly. The wear sub-assembly includes a heat shield canopy extending over the flow control sub-assembly.

In another aspect, a method of maintaining a synthesis gas (syngas) cooler for use within a gasifier system is provided. The method includes breaking at least a portion of at least one of a circumferential non-bonded joint and a circumferential seam weld on a quench ring assembly that couples a wear sub-assembly to a main structural member at a circumferential coupling site. The method also includes removing at least a portion of the wear sub-assembly and a flow control sub-assembly coupled thereto from the main structural member. The method further includes providing at least one replacement portion of the wear sub-assembly. The method also includes positioning the at least one replacement portion of the wear sub-assembly to extend over at least a portion of the flow control sub-assembly and to abut the main structural member proximate the circumferential coupling site. The method further includes coupling the at least one replacement portion of the wear sub-assembly to the main structural member.

In a further aspect, a gasifier system is provided. The gasifier system includes at least one gasifier configured to produce a synthesis gas (syngas). The gasifier system also includes at least one syngas cooler coupled to at least one lower wall tube. The at least one syngas cooler includes a high-temperature vessel and a quench ring assembly. The quench ring assembly includes a main structural sub-assembly coupled to and circumferentially extending about the high-temperature vessel. The quench ring assembly also includes a flow control sub-assembly coupled to the main structural sub-assembly and extending circumferentially therethrough. The quench ring assembly further includes a wear sub-assembly removably coupled to the main structural sub-assembly. The wear sub-assembly includes a heat shield canopy extending over the flow control sub-assembly.

DETAILED DESCRIPTION OF THE INVENTION

Figure 1:
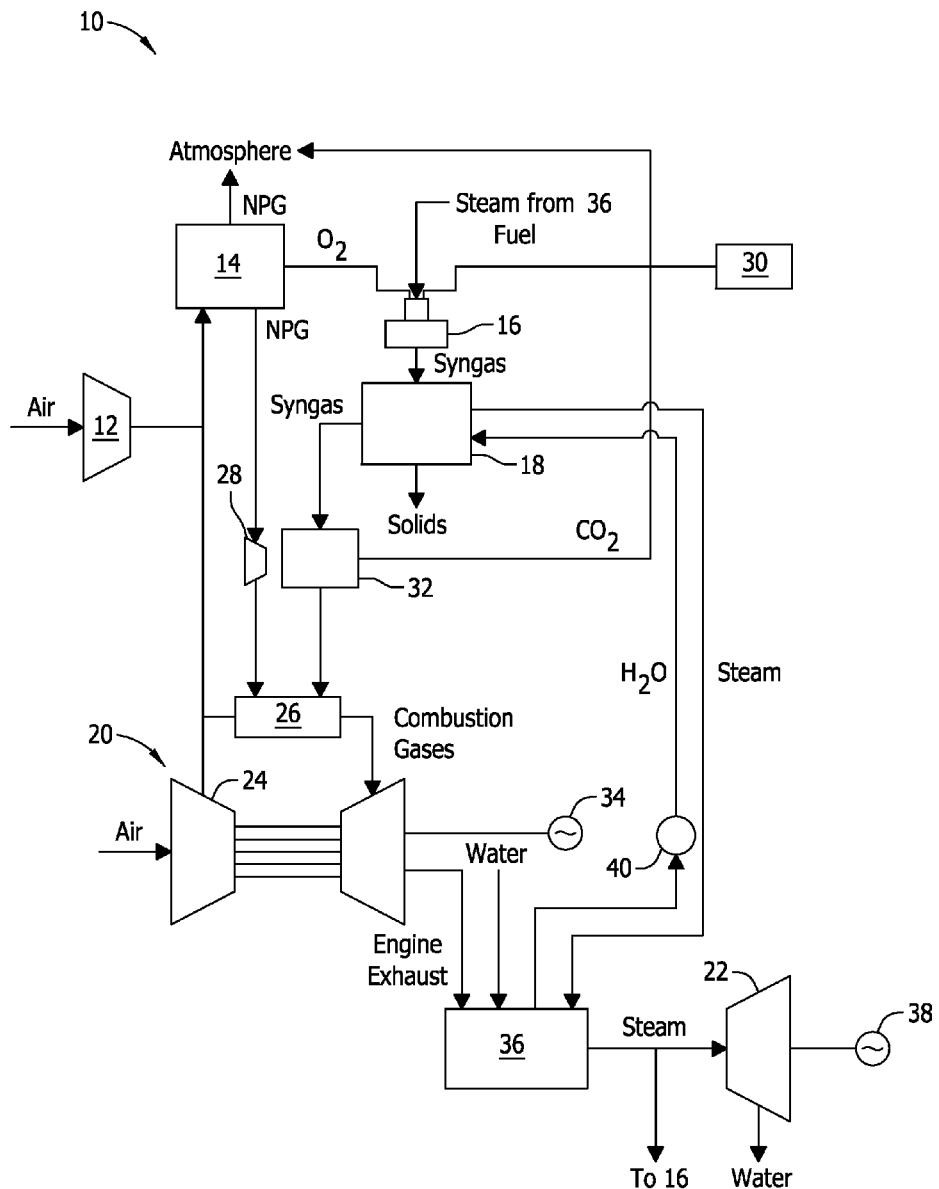
FIG. 1 is schematic view of an exemplary integrated gasification combined cycle power generation system.

FIG. 1 is a schematic diagram of an exemplary gasification facility, and more specifically, is a schematic diagram of an exemplary integrated gasification combined-cycle (IGCC) power generation system 10. IGCC system 10 generally includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication with syngas cooler 18, and a steam turbine engine 22 coupled in flow communication with syngas cooler 18. Alternatively, such gasification facility is a portion of any facility in any suitable configuration that enables operation of gasifier 16, including, without limitation, a chemical production plant.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen (O2) and a gas by-product, sometimes referred to as a "process gas". The O2 flow is channeled to gasifier 16 for use in generating synthesis gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at least some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a NPG compressor 28 for compressing the nitrogen process gas flow before being injected into a combustion zone (not shown) of gas turbine engine combustor 26.

In the exemplary embodiment, gasifier 16 converts a mixture of fuel supplied from a fuel supply 30, $O_2$ supplied by ASU 14, steam, and/or liquid water, and/or slag additive into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, syngas generated by gasifier 16 includes carbon monoxide, hydrogen, and carbon dioxide. In the exemplary embodiment, gasifier 16 is an entrained flow gasifier, configured to discharge syngas, slag, and fly ash vertically downward into syngas cooler 18. Alternatively, gasifier 16 may be any type and configuration that facilitates operation of syngas cooler 18 as described herein.

In the exemplary embodiment, syngas generated by gasifier 16 is channeled to syngas cooler 18 to facilitate cooling the syngas, as described in more detail below. The cooled syngas is channeled from cooler 18 to a clean-up device 32 that facilitates cleaning the syngas before it is channeled to gas turbine engine combustor 26 for combustion therein. Carbon dioxide ($CO_2$) may be separated from the syngas during clean-up and, in the exemplary embodiment, may be vented to the atmosphere. Gas turbine engine 20 drives a first generator 34 that supplies electrical power to a power grid (not shown). Exhaust gases from gas turbine engine 20 are channeled to a heat recovery steam generator (HRSG) 36 that generates steam for driving steam turbine 22. Power generated by steam turbine 22 drives a second generator 38 that also provides electrical power to the power grid. In the exemplary embodiment, steam from heat recovery steam generator 36 may be supplied to gasifier 16 for generating syngas.

Furthermore, in the exemplary embodiment, system 10 includes a pump 40 that supplies heated water from HRSG 36 to syngas cooler 18 to facilitate cooling syngas channeled from gasifier 16. The heated water is channeled through syngas cooler 18 wherein water is converted to steam. Steam from cooler 18 is then returned to HRSG 36 for use within gasifier 16, syngas cooler 18, and/or steam turbine 22.

Figure 2:
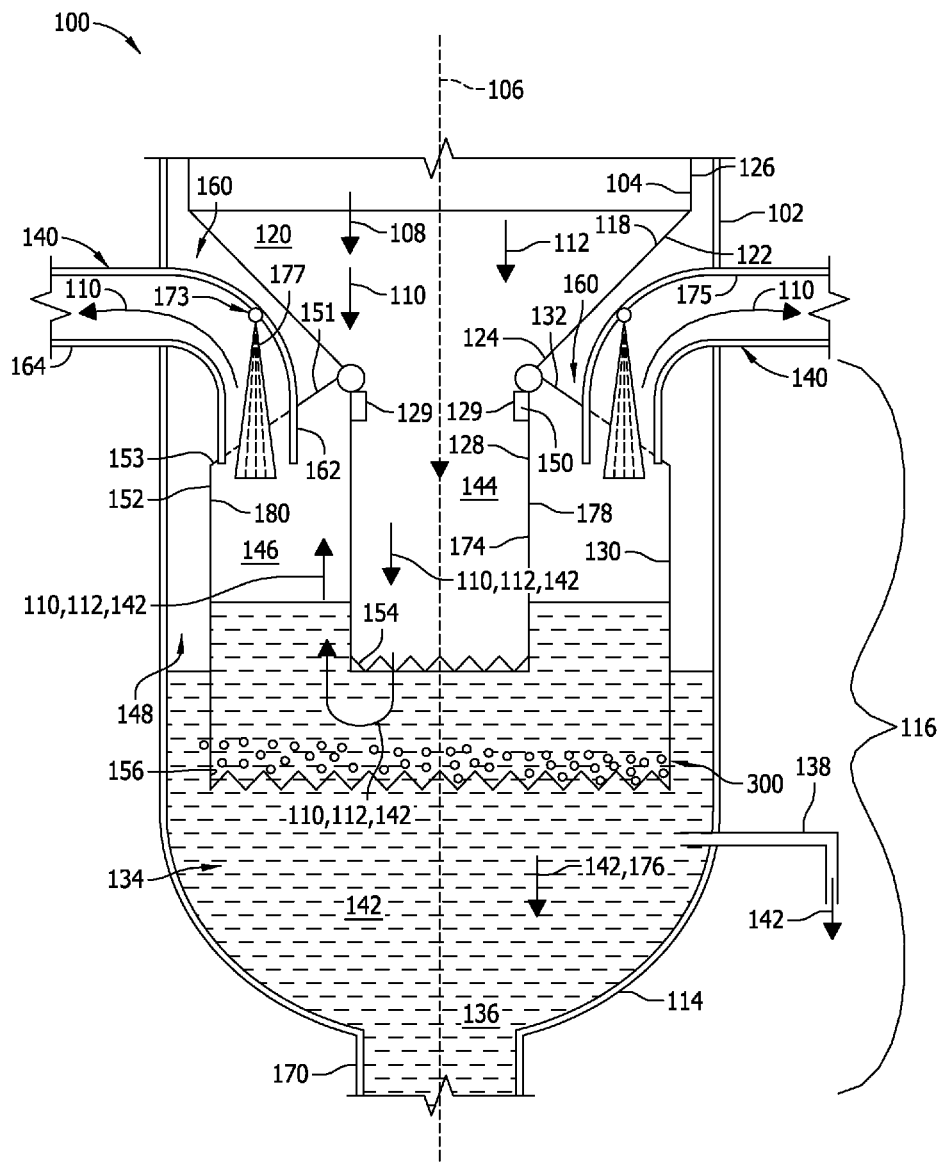
FIG. 2 is a schematic cross-sectional view of an exemplary syngas cooler that may be used with the system shown in FIG. 1.

FIG. 2 is a schematic cross-sectional view of a lower portion of an exemplary syngas cooler 100 that may be used with system 10 (shown in FIG. 1). Syngas cooler 100 is an exemplary embodiment of syngas cooler 18 (shown in FIG. 1) and is a radiant syngas cooler (RSC). Syngas cooler 100 includes a plurality of heat exchange devices, such as, but not being limited to, a heat exchange wall 104 and/or platen assemblies (not shown), positioned within a cooler shell 102. In the exemplary embodiment, heat exchange wall 104 substantially isolates shell 102 from syngas 110 flowing through cooler 100. Also, in the exemplary embodiment, shell 102 has a substantially circular cross-sectional shape having a longitudinal axis, or centerline 106. Alternatively, shell 102 may have any cross-sectional shape that facilitates operation of cooler 100 as described herein. A main syngas flowpath 108 is defined within cooler 100 along which syngas 110 and/or particulates 112 generally flow. In some embodiments, shell 102 and wall 104 are fabricated from any material that facilitates preventing syngas 110 and particulate material 112 from substantially adhering to shell 102 and wall 104.

In the exemplary embodiment, flowpath 108 is generally aligned parallel with centerline 106. Although syngas 110 and particulates 112 are shown as separate flows, it will be understood that particulates 112 may be entrained with and/or suspended within syngas 110 such that particulates 112 and syngas 110 constitute a combined flow. Furthermore, as used herein, the terms "upstream" and "downstream" are defined with respect to main syngas flowpath 108, such that a top (not shown) of cooler 100 is considered to be "upstream" from a bottom 114 of cooler 100. Also, as used herein, particulates 112 is defined to include molten ash particulates, char, and fly ash particulates.

Cooler 100 also includes a quench chamber 116 that is downstream from the heat exchange devices. Chamber 116 facilitates rapidly cooling syngas 110 and/or particulates 112. More specifically, a lower wall 118 separates quench chamber 116 from a heat exchange section 120 of cooler 100 including the heat exchange devices (as described above) therein. In the exemplary embodiment, lower wall 118 is formed from a plurality of heat exchange tubes (not shown). Alternatively, in other embodiment, lower wall 118 is fabricated from a refractory liner material. Moreover, in some embodiments, quench chamber 116 and lower wall 118 are fabricated from any material that facilitates preventing syngas 110 and particulate material 112 from substantially adhering to quench chamber 116 and lower wall 118. In the exemplary embodiment, lower wall 118 is substantially conical and tapers inwardly, or converges from an upstream end 122 of lower wall 118 to a downstream end 124 of lower wall 118. Moreover, upstream end 122 may be coupled to, and/or positioned adjacent to, a downstream end 126 of heat exchange wall 104. Alternatively, lower wall 118 may be coupled to any other suitable component within syngas cooler 100 that enables operation of cooler 100 as described herein.

In the exemplary embodiment, quench chamber 116 includes a dip tube 128, a quench ring assembly 129, an isolation tube 130, a splash plate 132, a fluid retention chamber, or water bath 134, a sump 136, a blowdown line 138, a water bath fluid makeup supply line (not shown) and at least one syngas outlet 140. In some embodiments, dip tube 128 and isolation tube 130 are fabricated from any material that facilitates preventing syngas 110 and particulate material 112 from substantially adhering to dip tube 128 and isolation tube 130.

Water bath 134 includes bath water 142, wherein although water 142 is described herein as the fluid used to quench syngas 110 and/or particulates 112, any suitable non-reactive fluid may be used for quenching. In the exemplary embodiment, quench ring assembly 129 is situated at an upstream end 150 of dip tube 128, and is used to wet and cool an inner wall 174 of dip tube 128, as well as facilitate cooling and scrubbing of syngas 110 and particulates 112. Upstream end 150 is coupled to quench ring assembly 129 through a circumferential weld (not shown). Alternatively, upstream end 150 is coupled to quench ring assembly 129 through any coupling method that enables operation of quench ring assembly 129 and cooler 100 as described herein.

To facilitate mitigating deposition of molten particulates 112 on dip tube 128 due to direct contact of relatively hot particulates 112 with dip tube 128, dip tube 128, as well as quench ring assembly 129, are preferably somewhat recessed relative to downstream end 124 of lower wall 118.

Dip tube 128, quench ring assembly 129, and isolation tube 130 each have a substantially circular cross-section. In the exemplary embodiment, dip tube 128, quench ring assembly 129, and isolation tube 130 are substantially concentrically aligned with centerline 106. As such, a primary quench zone 144 is defined within dip tube 128, a first substantially annular passage 146 is defined between dip tube 128 and isolation tube 130, and a second substantially annular passage 148 is defined between isolation tube 130 and shell 102.

Moreover, in the exemplary embodiment, upstream end 150 of dip tube 128 is coupled proximate to an upstream end 151 of splash plate 132, an upstream end 152 of isolation tube 130 is coupled proximate to a downstream end 153 of splash plate 132, and a downstream end 154 of dip tube 128 is positioned upstream from a downstream end 156 of isolation tube 130. Each upstream end 150 and 151 is positioned proximate to lower wall 118. Specifically, in the exemplary embodiment, each upstream end 150 and 151 is positioned proximate to downstream end 124 of lower wall 118. Downstream end 154 of dip tube 128 extends into water bath 134, thereby facilitating quenching and scrubbing of syngas 110 and particulates 112 exiting downstream end 154 by water 142.

Downstream end 156 of isolation tube 130 also extends into water bath 134. In the exemplary embodiment, downstream end 154 of dip tube 128 is serrated to help distribute syngas 110 as it enters into water bath 134 beneath dip tube 128. Similarly, in the exemplary embodiment, downstream end 156 of isolation tube 130 is serrated to help syngas 110 to flow within water bath 134, between annular passage 146 and annular passage 148. In an alternative embodiment, downstream ends 154 and/or 156 of tubes 128 and/or 130, respectively, may have any suitable shape that facilitates operation of cooler 100 as described herein.

A third passage 160 is defined between splash plate 132 and shell 102. Splash plate 132 facilitates retaining syngas 110 and water 142 within isolation tube 130. In the exemplary embodiment, splash plate 132 is generally annular and extends between upstream end 151 and downstream end 153. In the exemplary embodiment, downstream end 153 of splash plate 132 is coupled proximate to upstream end 152 of isolation tube 130 and/or to heat exchange wall downstream end 126. In the exemplary embodiment, splash plate 132 is generally frusto-conical. Splash plate 132 is fabricated from any material that facilitates preventing syngas 110, water 142, and particulate material 112 from substantially adhering to splash plate 132. As such, splash plate 132 facilitates preventing accumulation of particulates 112 in syngas 110 as well as knockout of non-evaporated entrained water droplets, such that particulates 112 and water droplets (not shown) fall into water bath 134 after contacting splash plate 132.

At least one syngas outlet 140 is defined between splash plate 132 and shell 102 such that syngas outlet 140 is in flow communication with third passage 160. Outlet 140 channels syngas 110 from isolation tube 130 to a component outside of shell 102. As shown in FIG. 2, cooler 100 includes two outlets 140 extending from within isolation tube 130 through splash plate 132 and through shell 102. Although only two outlets 140 are shown in FIG. 2, alternatively, cooler 100 may include any number of outlets 140 that facilitate operation of cooler 100 as described herein.

In the exemplary embodiment, each outlet 140 is a cylindrical tube that has a generally arcuate cross-sectional profile extending between a first end 162 and a second end 164. Alternatively, outlet 140 may have any shape that facilitates operation of cooler 100 as described herein. Specifically, in the exemplary embodiment, outlet 140 extends from first end 162, positioned within isolation tube 130 near upstream end 152, through splash plate 132, and through shell 102. In the exemplary embodiment, outlet second end 164 may be coupled to cleanup device 32 (shown in FIG. 1), gas turbine engine 20 (shown in FIG. 1), and/or any other suitable component that facilitates operation of system 10 and cooler 100 as described herein.

In the exemplary embodiment, each outlet 140 includes at least one spray injector 173 coupled thereto that channels a spray fluid stream 177 into outlet 140. Specifically, each spray injector 173 is coupled to an inner surface 175 of outlet 140. Alternatively, each spray injector 173 is coupled to any surface that facilitates operation of cooler 100 as described herein. Moreover, in the exemplary embodiment, spray injector 173 is coupled within outlet 140 such that flow discharged therefrom is discharged longitudinally downward substantially in diametric opposition against the longitudinally upward flow of syngas 110 into outlet 140. Alternatively, at least one spray injector 173 is oriented to discharge fluid stream 177 in a direction that is at least partially oblique to at least a portion of syngas 110 flow within outlet 140. Also, alternatively, at least one spray injector 173 is oriented to discharge fluid stream 177 in a direction that is substantially parallel to and coincident with at least a portion of syngas 110 flow within outlet 140. Further, alternatively, at least one spray injector 173 is oriented in any direction that facilitates operation of syngas cooler 100 as described herein. Moreover, alternatively, injector 173 is a gas injector that forms a gas quenching stream 177.

Moreover, each spray injector 173 is selectively operable as described above. Typically, in the exemplary embodiment, spray injector 173 is in continuous operation with substantially constant flow rates. Under some conditions, fluid flow rates may be modulated as a function of a mode of operation. Alternatively, any periodicity of spray operation with any fluid flow rates that facilitate operation of cooler 100 as described herein are used. When each spray injector 173 is in operation, spray injector 173 injects fluid spray stream 177 as described above. Spray injector 173 and spray stream 177 facilitate eliminating non-evaporated entrained water droplets, and substantially reduces and/or prevents accumulation of particulates 112, and/or water 142 from along walls and/or surfaces of components within cooler 100 that include, but are not limited to, an outer surface 178 of dip tube 128, an inner surface 180 of isolation tube 130, and at least a portion of surface 175 of outlet 140.

Furthermore, spray injector 173 and stream 177 facilitate further cooling of syngas 100. Moreover, spray injector 173 and spray stream 177 may be adjusted to mitigate accumulation and agglomeration of particulates 112 within water bath 134 and sump 136. As such, with less accumulation on walls and/or surfaces of components within cooler 100, as well as less agglomeration in water 142, less plugging and/or fouling of such components occurs. Outlet 140 includes any number of spray injectors 173 that enables cooler 100 to function as described herein. In an alternative embodiment, outlet 140 does not include any spray injectors 173. In a still further alternative embodiment, at least one spray injector 173 is coupled to splash plate 132, isolation tube 130, and/or any suitable component of cooler 100 that facilitates operation of cooler 100 as described herein.

As described above, fluid 177 discharged from spray injector 173 may flow downstream into water bath 134. In the exemplary embodiment, water bath 134 includes water 142, sump 136, and blowdown line 138. Water bath 134 forms a portion of quench chamber 116 that is configured to retain water 142 therein. Although water bath 134 is shown and described as having water 142 contained therein, water bath 134 may include suitable fluids other than water 142 and still be considered to be a "water bath." Moreover, spray injectors 173 are coupled in flow communication with a fluid source (not shown), wherein such fluid that forms spray streams 177 is compatible with the fluids within water bath 134 and streams 177 mix within water 142 such that water 142 is considered to include fluids from streams 177, if any.

Downstream from dip and isolation tube ends 154 and 156, respectively, sump 136 is defined within water bath 134. More specifically, sump 136 may include a collection cone (not shown) coupled within shell 102 and a cylindrical sump outlet 170 that extends through shell bottom 114. Sump outlet 170 may be coupled to a slag crusher (not shown), a lock hopper (not shown), a pump (not shown), and/or any other wet particulate handling and/or removal device that facilitates operation of system 10 as described herein.

Also, in the exemplary embodiment, blowdown line 138 extends from water bath 134 through shell 102, and is configured to regulate the volume of water 142 within water bath 134. The water (not shown) that is blown down through blowdown line 138 is normally sent to a process water handling system (not shown) that enables the beneficial reuse of at least some of the blown down water. However, the blown down water may be sent to any suitable component, system, and/or location that facilitates operation of system 10 as described herein.

During system operation, syngas 110 with particulates 112 is channeled from gasifier 16 to cooler 100. Syngas 110 flows through the heat exchange devices within cooler 100 and into quench chamber 116. More specifically, lower wall 118 of cooler 100 channels syngas 110 with particulates 112 into primary quench zone 144, wherein syngas 110 flows past downstream end 124 of lower wall 118 and along inner wall 174 of dip tube 128, into water bath 134. Plugging of dip tube 128 is mitigated by the combined effects associated with the recessed position of inner wall 174 relative to downstream end 124 of lower wall 118, the relatively lower temperature of wall 174 as compared to particulates 112, which is partially cooled by water 142 external to dip tube 128, and relatively high momentums of the larger molten particles as contrasted with relatively lower momentums of the smaller cooler particles. Moreover, in the exemplary embodiment, quench ring assembly 129 wet and cool inner wall 174 of dip tube 128, as well as facilitate cooling and scrubbing of syngas 110 and particulates 112.

Particulates 112 that are solidified are referred to herein as solidified slag 176. Solidified slag 176 is formed after falling through primary quench zone 144 into water bath 134 and is discharged from cooler 100 through sump 136 via sump outlet 170. Syngas 110 and remaining particulates 112 rise up through passage 146 where syngas 110 is scrubbed further by one or more sprays 177, causing additional particulates 112 to fall and be captured in water bath 134, while syngas 110 and any remaining particles 112 exit syngas cooler 100 through one or more nozzles 140. In the exemplary embodiment, syngas 110 and/or, particulates 112 exiting water bath 134 are at a reduced temperature relative to syngas 110 and/or particulates 112 entering water bath 134.

Scrubbed syngas 110, which is substantially without particulate 112 and/or entrained water 142, is channeled from first passage 146 through outlet 140 for use within system 10. In the exemplary embodiment, spray injector 173 sprays syngas 110 with fluid spray 177 before syngas 110 is channeled through outlet 140. As such, the fluid from spray injector 173 facilitates preventing accumulation of particulates 112 on surface 175 of outlet 140 and also facilitates preventing plugging of isolation tube 130, and/or outlet 140. Moreover, fluid spray 177 facilitates any further separation of particulates 112 from syngas 110 and any further cooling of syngas 110.

Figure 3:
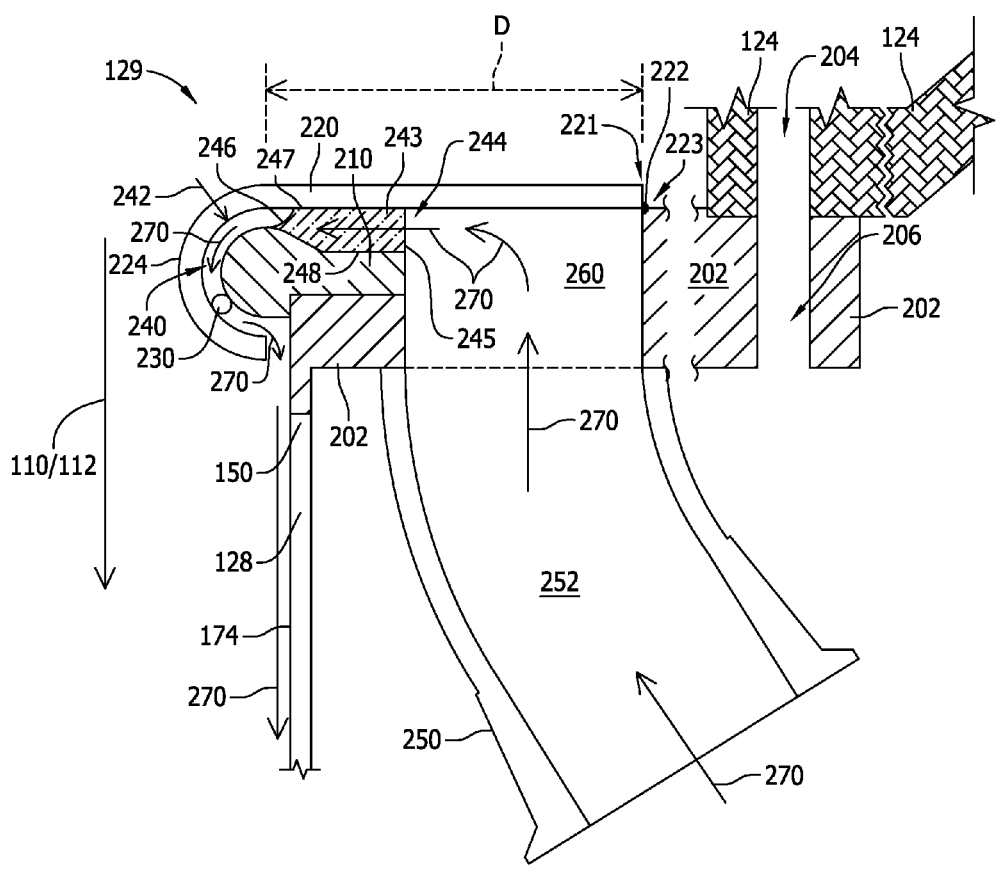
FIG. 3 is a schematic cross-sectional view of an exemplary quench ring assembly that may be used with the syngas cooler shown in FIG. 2.

FIG. 3 is a schematic cross-sectional view of quench ring assembly 129 that may be used with syngas cooler 100 (shown in FIG. 2). In the exemplary embodiment, quench ring assembly 129 has a substantially circular cross-section that is substantially concentrically aligned with centerline 106 (shown in FIG. 2). Quench ring assembly 129 includes a main structural sub-assembly 202 coupled to downstream end 124 of lower wall 118 (shown in FIG. 2). As described above, in the exemplary embodiment, lower wall 118, including downstream end 124, is formed from a plurality of heat exchange tubes (not shown). Main structural sub-assembly 202 is fabricated through a forging process. Alternatively, main structural sub-assembly 202 is fabricated through any process that enables operation of quench ring assembly 129, including, without limitation, welding and machining of arcual portions (not shown) of main structural sub-assembly 202.

In the exemplary embodiment, main structural sub-assembly 202 is fastened to downstream end 124 through a plurality of circumferential fasteners (not shown) that are inserted though aligned fastener holes 204 and 206 defined through downstream end 124 and main structural sub-assembly 202, respectively. Alternatively, any method of coupling main structural sub-assembly 202 to cooler shell 102 that enables operation of quench ring assembly 129 as described herein is used, including, without limitation, seal welding.

Also, in the exemplary embodiment, quench ring assembly 129 includes a flow control sub-assembly 210 coupled to main structural sub-assembly 202 and extending circumferentially therethrough. Flow control sub-assembly 210 includes two semi-circular ring segments (not shown) coupled through an interference, or friction fit to main structural member 202.

Further, in the exemplary embodiment, quench ring assembly 129 includes a wear sub-assembly 220 removably coupled to main structural sub-assembly 202. Wear sub-assembly 220 is a unitary, substantially circular piece that is coupled to main structural sub-assembly 202 through one of a circumferential non-bonded joint 221 and a circumferential seam weld 222 positioned at a circumferential coupling site 223 defined at the contact point of wear sub-assembly 220 with main structural sub-assembly 202. Wear sub-assembly 220 includes a heat shield canopy 224 extending over flow control sub-assembly 210. Circumferential coupling site 223 is positioned a predetermined distance D from heat shield canopy 224. Distance D has any value that facilitates sufficient set-back either of non-bonded joint 221 and seam weld 222 from the deleterious effects of syngas 110 and particulates 112. Heat shield canopy 224 is substantially C-shaped and is configured to extend over flow control sub-assembly 210 along the entire circumference (not shown) of flow control sub-assembly 210. Alternatively, wear sub-assembly 220 includes a plurality of wear segments (not shown) configured to at least partially extend over a portion of flow control sub-assembly 210.

Moreover, in the exemplary embodiment, quench ring assembly 129 includes a plurality of separation devices 230 coupled to, and extending between, flow control sub-assembly 210 and heat shield canopy 224. A predetermined number of separation devices 230 are circumferentially positioned at predetermined spacings (not shown). Separation devices 230 facilitate defining a cooling fluid flow channel 240 between flow control sub-assembly 210 and heat shield canopy 224. Cooling fluid flow channel 240 defines a separation distance 242 extending between flow control sub-assembly 210 and heat shield canopy 224. Channel 240 defines any distance value that facilitates sufficient cooling fluid flow values that enable operation of quench ring assembly 129 and syngas cooler 100 as described herein. Separation devices 230 are high-temperature ball bearings. Alternatively, separation devices 230 may be any devices that enable operation of quench ring assembly 129 as described herein. Also, alternatively, separation devices 230 may be positioned downstream within cooling fluid flow channel 240 to extend between main structural sub-assembly 202 and heat shield canopy 224.

Also, in the exemplary embodiment, flow control sub-assembly 210 is coupled to wear sub-assembly 220 through a plurality of flow plates 243 (only one shown) that at least partially define a plurality of channels 244. Channels 244 are coupled in flow communication with cooling fluid flow channel 240. Each of flow plates 243 includes a substantially vertical upstream side 245 and a curved downstream side 246. Also, each of flow plates 243 include an upper side 247 that is coupled to wear sub-assembly 220 through any method that enables operation of quench ring assembly 129 as described herein, including, without limitation, welding, an interference, or friction fit within a slot (not shown) defined in wear sub-assembly 220, and an interference fit with wear sub-assembly 220 without a slot. Further, each of flow plates 243 include a lower side 248 that is coupled to flow control sub-assembly 210 through any method that enables operation of quench ring assembly 129 as described herein, including, without limitation, welding, an interference, or friction fit within a slot (not shown) defined in flow control sub-assembly 210, and an interference fit with flow control sub-assembly 210 without a slot. Coupling flow plates 243 to wear sub-assembly 220 and coupling flow plates 243 to flow control sub-assembly 210 facilitates removal and replacement of wear sub-assembly 220 and flow control sub-assembly 210 together to decrease interference with and/or dislodging of main structural sub-assembly 202.

Further, in the exemplary embodiment, syngas cooler 100 includes a plurality of cooling fluid inlet pipes 250 that each define a cooling fluid inlet passage 252. A predetermined number of cooling fluid inlet pipes 250 are circumferentially positioned at predetermined spacings (not shown). Cooling fluid inlet pipes 250 are coupled to main structural sub-assembly 202 and cooler shell 102. Main structural sub-assembly 202 and wear sub-assembly 220 define a circumferential cooling fluid manifold 260 coupled in flow communication with each cooling fluid inlet passage 252. Circumferential cooling fluid manifold 260 is coupled in flow communication with cooling fluid flow channel 240 through channels 244.

Moreover, as described above, in the exemplary embodiment, dip tube 128 is coupled to main structural sub-assembly 202 at upstream end 150.

During system operation, syngas 110 with particulates 112 is channeled from gasifier 16 (shown in FIG. 2) to cooler 100. Syngas 110 with particulates 112 flow into primary quench zone 144 along inner wall 174 of dip tube 128, into water bath 134 (shown in FIG. 2). Plugging of dip tube 128 is mitigated by quench ring assembly 129 wetting and cooling inner wall 174. Specifically, cooling fluid 270 is channeled through cooling fluid inlet pipes 250 into cooling fluid inlet passages 252. Cooling fluid 270 is then channeled into circumferential cooling fluid manifold 260, into cooling fluid flow channel 240 through channels 244, and then onto cooling inner wall 174.

Figure 4:
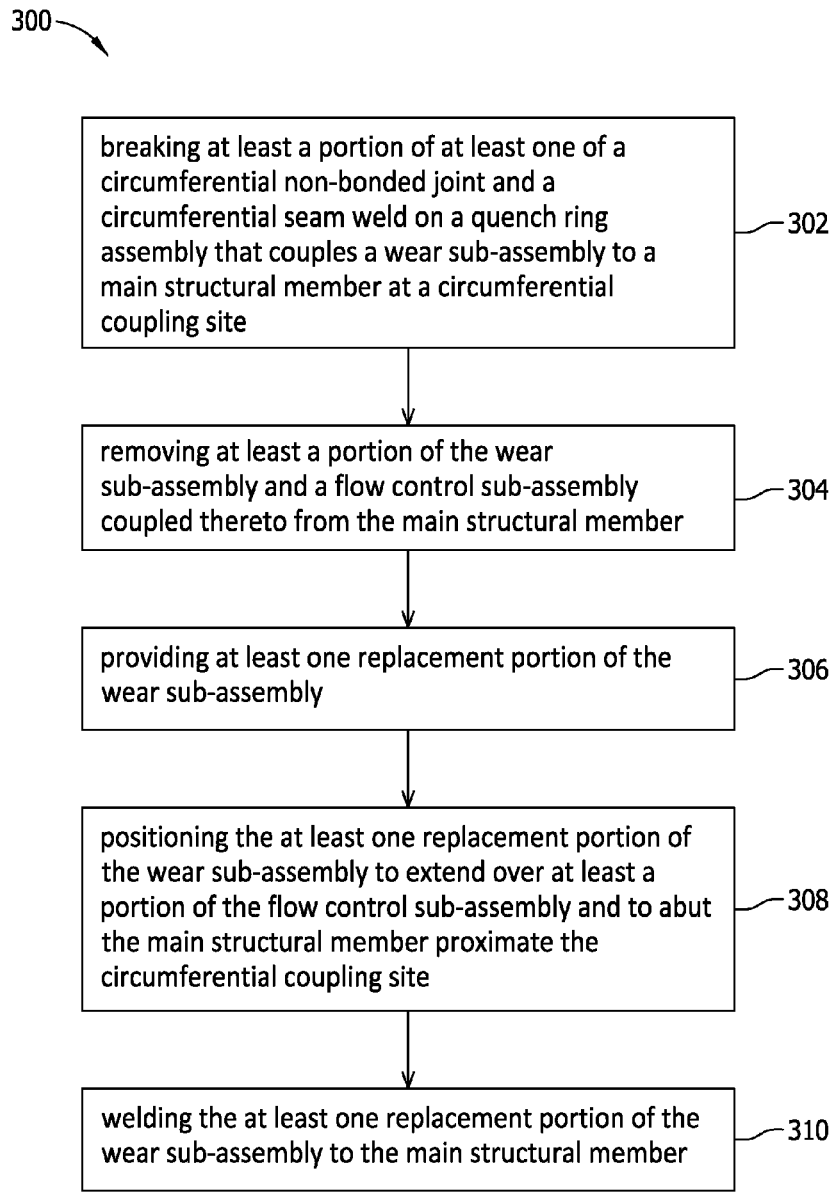
FIG. 4 is a flow chart of an exemplary method of maintaining the syngas cooler shown in FIG. 2.

FIG. 4 is a flow chart of an exemplary method 300 of maintaining syngas cooler 100 (shown in FIG. 2). At least a portion of circumferential non-bonded joint 221 and/or circumferential seam weld 222 positioned on quench ring assembly 129 that couples wear sub-assembly 220 to main structural member 202 at circumferential coupling site 223 is broken 302. Such breaking 302 of circumferential seam weld 222 may include grinding out at least a portion of the circumferential seam weld 222. A least a portion of wear sub-assembly 220 and a portion of flow control sub-assembly 230 are removed 304 from main structural member 202. At least one replacement portion of wear sub-assembly 220 is provided 306 either through a refurbished wear sub-assembly 220 or a new wear sub-assembly 220. The replacement portion of wear sub-assembly 220 is positioned 308 to extend over at least a portion of flow control sub-assembly 230 and to abut main structural member 202 proximate circumferential coupling site 223. The replacement portion of wear sub-assembly 220 is coupled 310 to main structural member 202 through at least one of circumferential non-bonded joint 221 and/or circumferential seam weld 222.

In contrast to known quench rings and replacement methods, the quench rings and replacement methods as described herein facilitate improving the efficiency of replacement maintenance activities without having to disconnect the entire quench ring from a gasifier cooler dip tube. Specifically, in contrast to known quench rings and replacement methods, the quench rings and replacement methods as described herein include removing only a radially innermost portion of the quench ring that is exposed to the highest temperatures and most erosive particulate flow. More specifically, a worn wear sub-assembly that includes a heat shield canopy and a coupled flow control-subassembly is removed and either a refurbished or a new wear sub-assembly and heat shield canopy is installed over the flow control-subassembly and all are reinstalled in the quench ring as a unit. The remainder of the quench ring remains attached to the dip tube, thereby decreasing a potential for misalignment of quench ring components as may be induced by the current repair practices. Therefore, maintenance activities associated with quench rings are decreased in scope, time, and cost.

Described herein are exemplary embodiments of quench rings that facilitate improved commercial operation over that of known quench rings. The above-described methods, apparatus, and systems facilitate reducing maintenance activities associated with planned outages. Such methods, apparatus, and systems also facilitate reducing unnecessary quench ring disassembly as compared to known quench rings. Specifically, the above-described methods, apparatus, and systems enable relatively fast and efficient replacement of worn wear sub-assemblies that include a heat shield canopy with either a refurbished or a new wear sub-assembly and heat shield canopy. A coupled flow control sub-assembly is also removed with the wear sub-assembly. Also, specifically, the remainder of the quench ring remains in place, thereby decreasing a potential for misalignment of quench ring components. Therefore, maintenance activities associated with quench rings are decreased in scope, time, and cost.

An exemplary technical effect of the methods, systems, and apparatus described herein includes at least one of (a) decreasing unnecessary quench ring disassembly, removal, and reassembly; and (b) decreasing a potential for misalignment of quench ring components.

The methods, apparatus, and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

What is claimed is:

1. A quench ring assembly for a high-temperature vessel comprising:
    a main structural sub-assembly coupled to at least one lower wall tube;
    a flow control sub-assembly coupled to said main structural sub-assembly and extending circumferentially therethrough;
    a wear sub-assembly removably coupled to said main structural sub-assembly, said wear sub-assembly comprising a heat shield canopy extending over said flow control sub-assembly; and
    at least one separation device coupled to and extending between said flow control sub-assembly and said heat shield canopy.

2. The quench ring assembly in accordance with claim 1, wherein said wear sub-assembly comprises at least one of a circumferential non-bonded joint and a circumferential seam weld coupling said wear sub-assembly to said main structural sub-assembly, said at least one of a circumferential non-bonded joint and a circumferential seam weld is positioned a predetermined distance from said heat shield canopy.

3. The quench ring assembly in accordance with claim 1, wherein:
    said main structural sub-assembly defines a circumferential manifold coupled in flow communication with at least one cooling fluid inlet passage; and
    said flow control sub-assembly and said heat shield canopy define a controlled cooling fluid flow channel therebetween, said controlled cooling fluid flow channel coupled in flow communication with said circumferential manifold.

4. The quench ring assembly in accordance with claim 1, wherein said at least one flow control sub-assembly comprises two semi-circular ring segments aligned to said main structural member.

5. The quench ring assembly in accordance with claim 1, wherein said wear sub-assembly comprises a plurality of wear segments, wherein each of said wear segments is configured to at least partially extend over said flow control sub-assembly.

6. A gasifier system comprising:
    at least one gasifier configured to produce a synthesis gas (syngas); and
    at least one syngas cooler coupled in flow communication with said gasifier, said at least one syngas cooler comprising:
        a high-temperature vessel; and
        a quench ring assembly comprising:
            a main structural sub-assembly coupled to at least one lower wall tube;
            a flow control sub-assembly coupled to said main structural sub-assembly and extending circumferentially therethrough;
            a wear sub-assembly removably coupled to said main structural sub-assembly, said wear sub-assembly comprising a heat shield canopy extending over said flow control sub-assembly; and
            at least one separation device coupled to and extending between said flow control sub-assembly and said heat shield canopy.

7. The gasifier system in accordance with claim 6, wherein said wear sub-assembly comprises at least one of a circumferential non-bonded joint and a circumferential seam weld coupling said wear sub-assembly to said main structural sub-assembly, said at least one of a circumferential non-bonded joint and a circumferential seam weld is positioned a predetermined distance from said heat shield canopy.

8. The gasifier system in accordance with claim 6, wherein:
    said main structural sub-assembly defines a circumferential manifold coupled in flow communication with at least one cooling fluid inlet passage; and
    said flow control sub-assembly and said heat shield canopy define a controlled cooling fluid flow channel therebetween, said controlled cooling fluid flow channel coupled in flow communication with said circumferential manifold.

9. The gasifier system in accordance with claim 6, wherein said at least one flow control sub-assembly comprises two semi-circular ring segments aligned to said main structural member.

10. The gasifier system in accordance with claim 6, wherein said wear sub-assembly comprises a plurality of wear segments, wherein each of said wear segments is configured to at least partially extend over said flow control sub-assembly.

11. A quench ring assembly for a high-temperature vessel comprising:
    a main structural sub-assembly coupled to at least one lower wall tube;
    a flow control sub-assembly coupled to said main structural sub-assembly and extending circumferentially therethrough, wherein said at least one flow control sub-assembly comprises two semi-circular ring segments aligned to said main structural member; and
    a wear sub-assembly removably coupled to said main structural sub-assembly, said wear sub-assembly comprising a heat shield canopy extending over said flow control sub-assembly.

* * * * *